M. IKE, C. OWINGS, C. BUTCHER AND M. DAWSON.
SHOCK ABSORBER.
APPLICATION FILED DEC. 18, 1918.
1,373,332.
Patented Mar. 29, 1921.
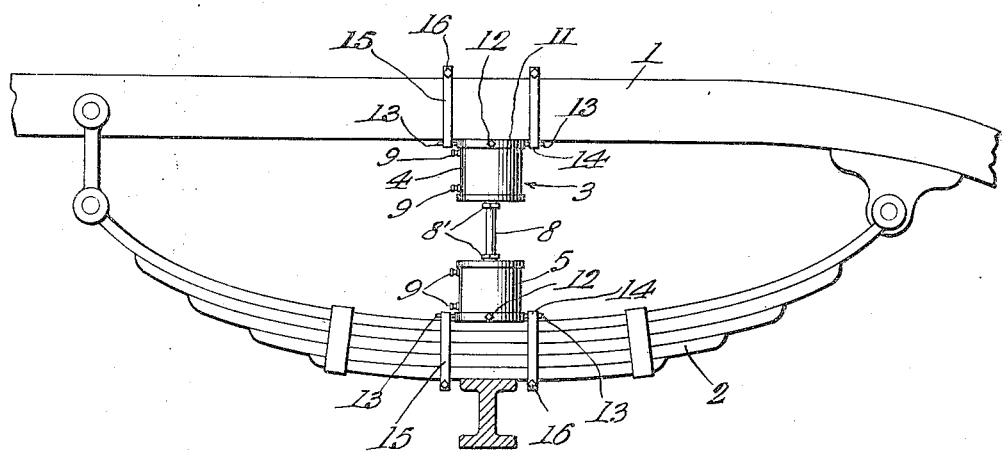
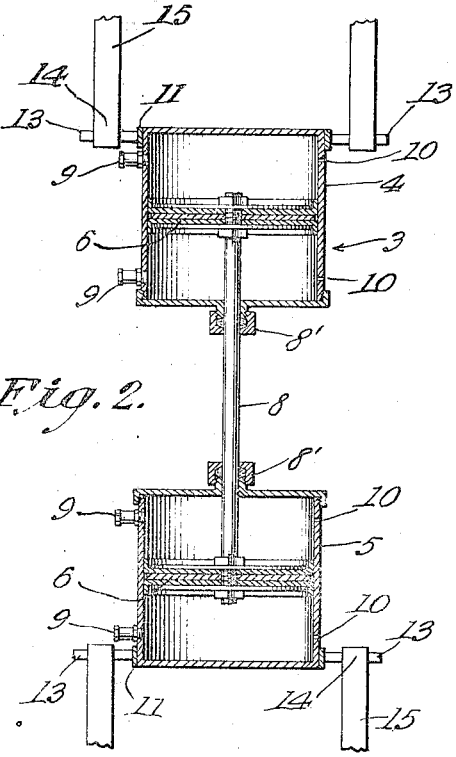
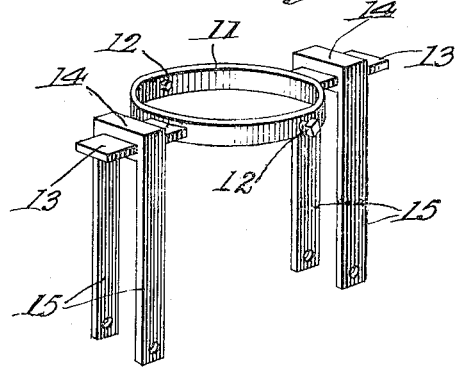
M. Ike
C. Owings  Inventors
C. Butcher and
M. Dawson
By Victor J. Evans
Attorney

UNITED STATES PATENT OFFICE.

MALCOME IKE, CHARLES OWINGS, CHARLES BUTCHER, AND MILLARD DAWSON, OF MORRAL, OHIO.

SHOCK-ABSORBER.

1,373,332. Specification of Letters Patent. Patented Mar. 29, 1921.

Application filed December 18, 1918. Serial No. 267,410.

*To all whom it may concern:*

Be it known that we, MALCOME IKE, CHARLES OWINGS, CHARLES BUTCHER, and MILLARD DAWSON, citizens of the United States, residing at Morral, in the county of Marion and State of Ohio, have invented new and useful Improvements in Shock-Absorbers, of which the following is a specification.

This invention relates to improvements in shock absorbing devices and has particular application to a shock absorbing device for use in connection with a spring vehicle.

In carrying out the present invention it is our purpose to provide a shock absorbing device for use in connection with the springs of motor vehicles which will be constructed in such manner that the same may be quickly and conveniently associated with the spring of the vehicle in order to assist the spring to absorb shock and jar incident to the vehicle wheels meeting irregularities in the roadway.

It is also our purpose to provide a device of the class described which will embrace the desired features of simplicity, efficiency and durability, which will operate effectively under all conditions and which will embody comparatively few parts and these so arranged and correlated as to reduce the possibility of derangement to a minimum.

In the accompanying drawings:—

Figure 1 is a view in side elevation showing our improved shock absorber used in connection with a vehicle spring.

Fig. 2 is a vertical sectional view through the same.

Fig. 3 is a perspective view of one of the securing bands for attaching the shock absorbing device to the vehicle.

Referring now to the drawing in detail, 1 designates one of the side bars of a motor vehicle while 2 indicates a semi-elliptical spring arranged below the side bar 1 having its extremities connected with the side bar 1 in any well-known approved manner. This semi-elliptical spring, as is usual, is interposed between the chassis of the motor vehicle and the wheel axle and acts to reduce the transmission of shock and jar to the body of the vehicle.

Our improved shock absorbing device is indicated as an entirety by the reference numeral 3 and, in accordance with our invention, is interposed between the semi-elliptical spring 2 and the side bar of the chassis or frame of the vehicle. In the present instance, the shock absorbing device embodies upper and lower cylinders 4 and 5 respectively spaced apart and pistons 6 within the cylinders 4 and 5 adapted for rectilinear movement therein. The pistons 6 are interconnected for simultaneous movement by means of a piston rod 8 that projects outwardly through the confronting ends of the cylinders and works within stuffing boxes 8' so as to insure fluid tight joints at the points where the piston rod works through the ends of the cylinders. The side wall of each cylinder immediately adjacent to each end wall thereof is equipped with an inwardly opening air valve 9 and a bleed port 10 so that air may be drawn into the particular end of the cylinder when the piston therein is moving away from such end and may be discharged from the cylinder when the piston is moving toward such end. By means of the construction just described, it will be seen that an air cushion is formed on each side of each piston which acts to reduce the shock both on the compression of the spring and on the rebound thereof. Thus, the occupants of the vehicle are permitted to ride with comparative comfort irrespective of any irregularities in the roadway.

In connection with the cylinders we employ attaching devices whereby the shock absorbing device as a whole may be quickly and conveniently applied to any vehicle without necessitating any changes in the construction of such vehicle. In the present instance, the attaching device embodies a band 11 encircling the outer end of each cylinder and fastened thereto by means of bolts 12. Each band, at diametrically opposite points, is formed with outwardly projecting arms 13. Slidably mounted upon the respective arms 13 are collars 14 and integral with the collars 14 and projecting therefrom are securing lugs 15. The lugs 15 carried by the top cylinder project upwardly while the lugs carried by the bottom cylinder extend downwardly, as clearly shown in the drawing. The upwardly projecting lugs 15 extend above the side bar of the vehicle frame, while the downwardly extending lugs project below the semi-elliptical spring 2. The outer ends of these lugs are formed with alining bolt holes and at the end of the bolt holes are threaded securing bolts 16 which act to hold the shock absorbing device in proper position between the vehicle body and the spring so that such device may coact with the spring to absorb the shock and jar.

We claim:—

1. In shock absorbing means, the combination of a vehicle frame a spring connected to the frame and having its intermediate portion spaced therefrom, cylinders arranged in alined relation between and bearing at their outer ends against the frame and spring and having air induction and eduction means, pistons in the cylinders, a rod extending between and through the inner heads of the cylinders and rigidly connecting the pistons whereby the same are adapted to move as a unit, and means connecting the cylinders to the frame and spring.

2. In shock absorbing means, the combination of a vehicle frame a spring connected to the frame and having its intermediate portion spaced therefrom, cylinders arranged in alined relation between and bearing at their outer ends against the frame and spring and having air induction and eduction means, pistons in the cylinders, a rod extending between and through the inner heads of the cylinders and rigidly connecting the pistons whereby the same are adapted to move as a unit, a band fixed on the outer end of each of the cylinders and mounted in opposed relation to the frame and spring respectively and having diametrically opposed radial arms, and securing lugs apertured to receive said arms and adjustable thereon, said lugs straddling and being secured on the frame and spring respectively.

In testimony whereof we affix our signatures.

MALCOME IKE.
CHARLES OWINGS.
CHARLES BUTCHER.
MILLARD DAWSON.